United States Patent [19]
Jarrett et al.

[11] 4,441,474
[45] Apr. 10, 1984

[54] FUEL INJECTION PUMPING APPARATUS

[75] Inventors: Boaz A. Jarrett, London; Dorian F. Mowbray, Burnham, both of England

[73] Assignee: Lucas Industries Limited, Birmingham, England

[21] Appl. No.: 331,824

[22] Filed: Dec. 17, 1981

[30] Foreign Application Priority Data

Dec. 31, 1980 [GB] United Kingdom ............... 8041540

[51] Int. Cl.³ .......................................... F04B 19/00
[52] U.S. Cl. .................................. 123/450; 123/500; 123/503; 417/462
[58] Field of Search ............... 123/450, 500, 501, 502, 123/503, 387; 417/462, 253

[56] References Cited

U.S. PATENT DOCUMENTS

| | | | |
|---|---|---|---|
| 2,069,744 | 2/1937 | Alden | 123/450 |
| 2,955,583 | 10/1960 | Dahl | 123/450 |
| 3,924,594 | 12/1975 | Aoki | 123/373 |
| 4,292,012 | 9/1981 | Brotherston | 123/450 |

FOREIGN PATENT DOCUMENTS

| | | | |
|---|---|---|---|
| 666491 | 10/1938 | Fed. Rep. of Germany | 123/450 |
| 558092 | 12/1943 | United Kingdom | 123/450 |

*Primary Examiner*—Charles J. Myhre
*Assistant Examiner*—Carl Stuart Miller

[57] ABSTRACT

A fuel injection pumping apparatus comprises a rotary distributor member which is also axially slidable within a fixed sleeve. The distributor member is provided with a recess which communicates with a bore containing the pumping plungers. The recess is provided with mutually inclined leading and trailing edges which cover and uncover inlet ports and outlet ports as the member rotates. While an inlet port is in communication with the recess fuel is allowed to flow to the bore and when the inlet ports are covered and outlet port is uncovered to the recess fuel flows from the bore to the uncovered outlet port. The fuel quantity is varied by altering the axial position of the distributor member.

5 Claims, 3 Drawing Figures

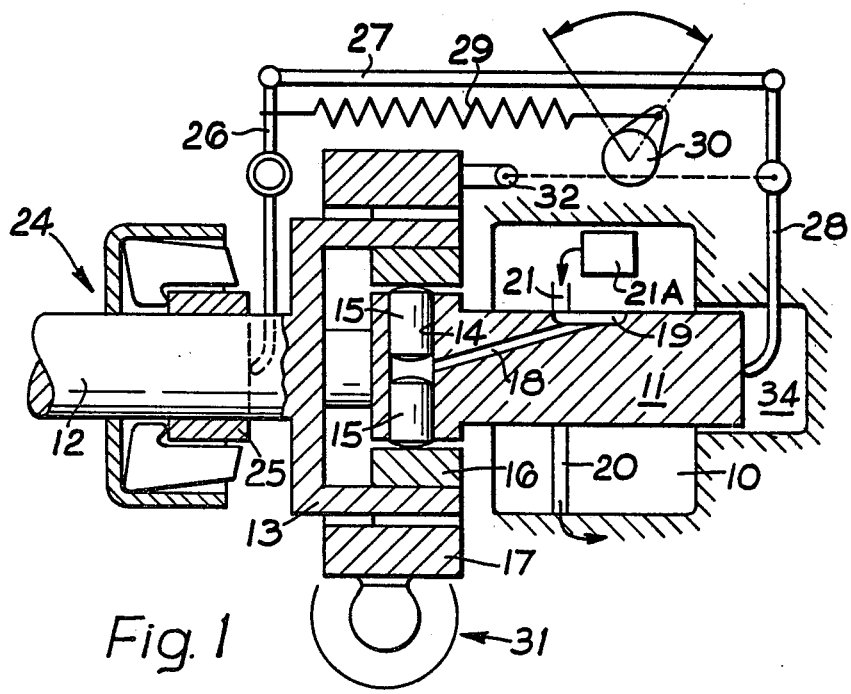
Fig. 1
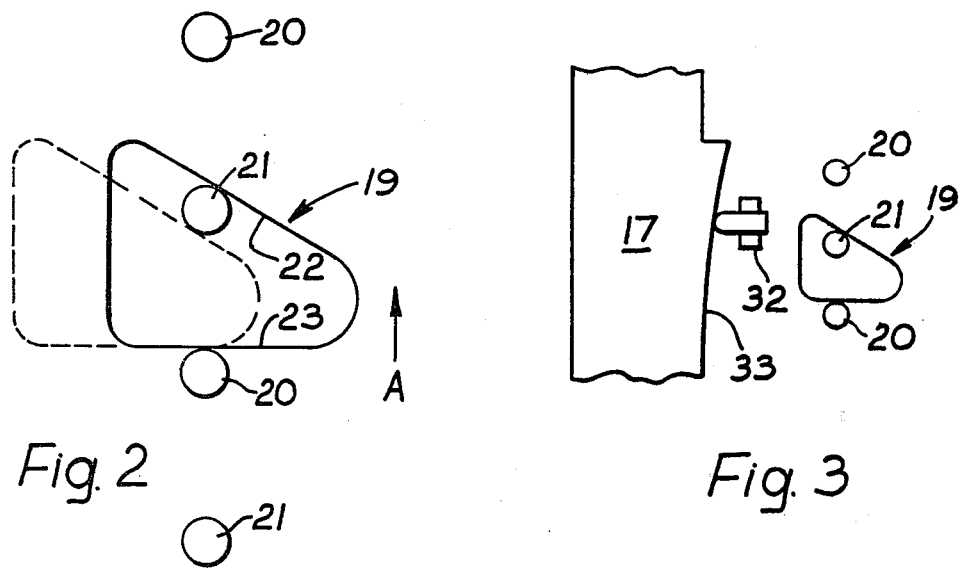
Fig. 2
Fig. 3

FUEL INJECTION PUMPING APPARATUS

This invention relates to fuel injection pumping apparatus for supplying fuel to a multiple cylinder internal combustion engine of the kind comprising a distributor member rotatable within a body part, a transverse bore formed in the distributor member and a plunger in the bore, a multi-lobed cam for effecting inward movement of the plunger as the distributor member rotates and means for conveying fuel to and from said bore.

Such apparatus is well known in the art and it is known to control the amount of fuel supplied by the apparatus to the associated engine, by controlling the amount of fuel which is supplied to the bore during a filling stroke of the apparatus. With this construction the timing of the start of delivery of fuel varies in accordance with the fuel quantity supplied by the apparatus since the instant at which the plunger is moved inwardly is governed by the position of the plunger in the bore and this in turn is determined by the amount of fuel supplied to the bore during the filling period.

Another form of the apparatus incorporates what is known in the art as a spill muff. This comprises a sleeve carried upon the distributor member and held against rotation although capable of limited axial and/or angular movement to alter the amount of fuel delivered by the apparatus. In this construction the bore is completely filled with fuel and hence the plunger always has the same position just before it is moved inwardly by the cam. Delivery of fuel therefore from the bore always occurs at the same time and hence the delivery of fuel to the engine may take place at the same time. Whether or not delivery of the fuel to the engine does take place at the same time depends at least in part, upon the construction of the spill muff and the co-operating passages in the distributor member. The quantity of fuel supplied to the engine depends upon the amount of fuel which is spilled from the bore during the inward movement of the plunger and the amount can be varied by altering the position of the spill muff. The provision of a spill muff presents practical difficulties since in order to locate the spill muff the distributor member must be made longer or its bearing area in the supporting body, shorter, as compared with the first type of apparatus discussed. It is undesirable to make the bearing area shorter since this may reduce the life of the apparatus and may also raise problems with leakage of fuel at high pressure. Moreover, the muff itself increases the possibility of fuel leakage.

The object of the present invention is to provide an apparatus of the kind specified in a simple and convenient form.

According to the invention in an apparatus of the kind specified the distributor member is axially movable within the body part and said means for conveying fuel comprises a passage in the distributor member, said passage communicating with said bore and opening into a recess on the periphery of the distributor member, said recess having a leading and a trailing edge in relation to the direction of rotation of the distributor member, said edges being mutually inclined, a plurality of outlet ports formed in the body part for connection in use to the injection nozzles of the associated engine, said outlet ports being equiangularly spaced about the distributor member, a plurality of inlet ports alternately arranged with said outlet ports, said recess registering with said ports as the distributor member rotates, a source of fuel under pressure connected to said inlet ports and means for varying the axial setting of said distributor member, the arrangement being such that when the distributor member is in the maximum fuel position all the fuel displaced by said plunger will be delivered through an outlet port and when the plunger is in the zero fuel position all the fuel displaced by said plunger will flow through an inlet port, part of the fuel flowing through an outlet port and the remainder through an inlet port when the distributor member is in an intermediate position.

An example of an apparatus in accordance with the invention will now be described with reference to the accompanying drawings in which:

FIG. 1 is a diagrammatic side elevation of the apparatus,

FIG. 2 is a developed view of part of the apparatus seen in FIG. 1 and

FIG. 3 is a plan view of part of the apparatus seen in FIG. 1.

Referring to the drawings the apparatus comprises a body part including a sleeve 10 in which is mounted a rotary cylindrical distributor member 11. The distributor member is coupled to a drive shaft 12 which in use is driven by a rotary part of the engine so that the distributor member rotates in timed relationship therewith. The drive shaft has integrally formed therewith a cup shaped member 13 which surrounds a portion of the distributor member.

In the aforesaid portion of the distributor member there is located a transversely extending bore 14 in which is mounted a pair of pumping plungers 15. The plungers are contacted by cam followers generally indicated at 16 and which are slidable within slots formed in the cup shaped member 13. Each cam follower includes a roller for engagement with the internal peripheral surface of an annular cam ring 17 supported in the body and on the internal peripheral surface of which is formed a plurality of pairs of cam lobes.

The cam ring is of sufficient width to permit axial movement of the distributor member in the sleeve 10.

Communicating with the bore 14 is one end of a passage 18 the other end of which communicates with a recess 19 formed on the periphery of the distribution member. The shape of the recess is more clearly seen in FIG. 2 and the direction of rotation of the distribution member is indicated by the arrow A. For communication with the recess 19 there is provided in the sleeve 10 two series of ports. The first series of ports referenced 20, communicate with outlets in the body and which are connected in use, to the injection nozzles of the associated engine. There are therefore as many ports 20 as there are engine cylinders. The ports 20 are equi-angularly spaced about the axis of rotation of the distributor member and lie in a common plane. The ports 21 of the second series also lie in the aforesaid plane and are alternately disposed with respect to the ports 20 being equi-angularly spaced. The ports 21 are connected together and to source 21A of fuel under pressure conveniently of a low pressure pump the rotary part of which is driven by the drive shaft 12.

As will be seen from FIG. 2, the recess 19 has a leading edge 22 and a trailing edge 23. The two edges are mutually inclined and in the particular example, the edge 23 extends parallel to the axis of rotation of the distributor member. The recess is shown in two positions in FIG. 2 the solid outline shows the positions of the recess when the distributor member is set to provide zero fuel and the dotted outline shows the position of the recess when the distributor member is set to provide maximum fuel. Considering firstly the distributor member in the maximum fuel setting. As shown in FIG. 2, the recess has just moved out of communication with the outlet port 20 and is not yet in communication with the inlet port 21. In this position the plungers will have moved inwardly their maximum extent and will be on the crest of the cam lobes. As the distributor member continues to rotate the rollers will start to move down the the trailing flanks of the cam lobes and the recess 19 will be brought into communication with an inlet port 21. Fuel can therefore flow through the port 21, the recess and the passage 18 to the bore to effect outward movement of the plungers. The rollers are held in engagement with the internal peripheral surface of the cam ring. As the distributor member continues to rotate a position will be reached at which the recess has just moved out of communication with the port 21 and is about to move into communication with the next port 20. As soon as this communication is established the plungers are moved inwardly by the cam lobes and fuel is displaced from the bore 14 and flows to the outlet 20 by way of the passage 18 and the recess. All the fuel which was supplied to the bore will now be supplied to the engine. Hence the maximum amount of fuel is supplied to the engine and whilst the term maximum is used this may not be the normal maximum amount of fuel for normal operation of the engine since it may be required to supply an excess of fuel to the engine for starting purposes.

Turning now to the situation when the distributor member is in the minimum fuel position and starting from the position shown in FIG. 2, as soon as the rollers have moved over the crests of the cam lobes fuel can flow to the bore 14 through the port 21 and this flow of fuel will continue until the bore is completely filled. As the distributor member continues to rotate the leading edge 22 of the recess will uncover the next port 20 however, the trailing edge 23 will not have moved over the port 21 through which the fuel was supplied to the bore hence even though the plungers may be moving inwardly, the fuel will flow through the port 21 rather than through the outlet 20. This is because the outlet may include a spring loaded delivery valve which is set to open at a high pressure of if such a valve is not provided, the valves in the fuel injection nozzles, will not be opened by the pressure developed in the bore whilst the recess is in communication with an inlet port 21. All the fuel which is displaced by the bore 14 will be returned to the low pressure pump and hence no fuel will be supplied by the apparatus to the associated engine. If now the distributor member is moved to an intermediate position, there will during rotation of the distributor member, be a period of time considered in relation to degrees of rotation of the distributor member, during which the recess 19 communicates only with an outlet 20 and during this period fuel will be supplied to the associated engine. Hence by altering the axial setting of the distributor member, the amount of fuel supplied to the engine can be varied. With the arrangement described the delivery of fuel will always occur at the same time since it is the covering of the inlet port 21 by the trailing edge 23 of the recess which determines when fuel delivery starts and this always takes place at the same position in view of the fact that the trailing edge is parallel to the axis of rotation of the distributor member.

Returning again to FIG. 1, this shows one way of achieving variation of the axial setting of the distributor member. A centrifugal mechanism generally indicated at 24 is provided and this includes a sleeve 25 slidable upon the input shaft. The sleeve 25 is connected to one end of a lever 26 which is coupled by means of a link 27, to one end of a further lever 28 the other end of which engages the end of the distributor member. The lever 26 is also connected to one end of a governor spring 29 the force exerted by which can be varied by means of a manually adjustable control member which is connected to a shaft 30 carrying a link to which the other end of the spring is connected. The force exerted by the mechanism 24 is balanced against the force exerted by the spring 29 and in use, as the weights of the centrifugal mechanism move outwardly to effect movement of the sleeve 25 towards the right, the distributor member will be moved to reduce the amount of fuel supplied to the engine.

It may be necessary to adjust the timing of delivery of fuel to the associated engine in accordance with for example speed and this can be effected by a conventional piston cylinder combination generally indicated at 31, which is subjected to the outlet pressure of a low pressure supply pump. With this arrangement however angular movement of the cam ring 17 to effect a timing adjustment, will also influence the amount of fuel supplied by the apparatus to the associated engine since the position of the cam lobes in relation to the position of the ports, is a controlling factor in determining the amount of fuel supplied by the apparatus. If therefore angular adjustment of the cam ring 17 is effected then in order to maintain the fuel delivery, it is necessary to reposition the distributor member. This can be effected by altering the pivot point of the lever 28 and as shown in FIG. 3, the pivot 32 for the lever 28 is adjustable by means of a face cam 33 which is formed on a side face of the cam ring 17.

Instead of a mechanical governor mechanism it is possible to utilize electronic governing of the amount of fuel supplied by the apparatus and the electronic governor would control the position of the distributor member by varying the pressure in a chamber 34 defined at the end of the distributor member remote from the plungers. The electronic control system would require a transducer to provide a signal indicative of the position of the distributor member. Moreover, the setting of the cam ring would be controlled electronically and by providing another transducer to provide a signal indicative of the position of the cam ring, the control system can be arranged to move the cam ring and also the distributor member to maintain the same delivery of fuel as the timing is altered.

With the apparatus described the rollers of the followers maintain contact with the internal surface of the cam ring at all times. It is therefore possible to construct the leading flanks of the cam lobes so that the initial rate of fuel delivery to the engine is comparatively low, the rate increasing as delivery of fuel takes place. This form of injection characteristic is particularly useful for a so called indirect injection engine i.e. where the fuel is delivered to a combustion chamber separate from the engine cylinder.

In the case of a direct injection engine i.e. where the fuel is delivered to the engine cylinder, it is desirable that the fuel should be delivered to the engine in the shortest possible period. This can be achieved by arranging that the delivery of fuel does not start until the rollers have moved onto the steeper portions of the leading flanks of the cam lobes. In this case it is desirable to control the spillage of fuel from the bore before delivery of fuel takes place. This is achieved by inclining the trailing edge 23 of the recess rather than the leading edge. As with the example shown in the drawings the face cam 33 can be utilized to adjust the axial setting of the distributor member in the event of movement of the cam ring 17, in order to maintain constant the amount of fuel delivered by the apparatus. For some applications it may be desirable to spill fuel at the start and at the end of delivery of fuel and this can be achieved by inclining the leading and trailing edges of the recess 19.

Where a single recess is provided on the distributor member; the latter is subjected to a considerable side thrust when fuel is being delivered to the engine. This side thrust can be minimised by providing a balancing recess which is more or less diametrically opposite the recess 19. The balancing recess cannot be of the same shape as the recess 19 otherwise it would be possible for fuel to be supplied to two outlets at the same time. It is possible in the case where spillage of fuel before and after delivery is required to arrange for one recess to control the spillage of fuel before delivery and the other the spillage of fuel after delivery.

I claim:

1. A fuel injection pumping apparatus for supplying fuel to a multiple cylinder internal combustion engine comprising a distributor member rotatable within a body part, a transverse bore formed in the distributor member and a plunger in the bore, a multi-lobed cam for effecting inward movement of the plunger as the distributor member rotates, said distributor member being axially movable within the body part, a passage in the distributor member, said passage communicating with said bore and opening into a recess on the periphery of the distributor member, said recess having a leading and a trailing edge in relation to the direction of rotation of the distributor member, said edges being mutually inclined, a plurality of outlet ports formed in the body part for connection in use to the injection nozzles of the associated engine, said outlet ports being equiangularly spaced about the distributor member, a plurality of inlet ports alternately arranged with said outlet ports, said recess registering with said ports as the distributor member rotates, a source of fuel under pressure connected to said inlet ports, means for varying the axial setting of said distributor member, the arrangement being such that when the distributor member is in the maximum fuel position all the fuel displaced by said plunger will be delivered through an outlet port and when the plunger is in the zero fuel position all the fuel displaced by said plunger will flow through an inlet port, part of the fuel flowing through an outlet port and the remainder through an inlet port when the distributor member is in an intermediate position, and means for varying the angular setting of said cam about the axis of rotation of said distributor member and further means responsive to the position of said cam for adjusting the axial setting of the distributor member to maintain the quantity of fuel delivered by the apparatus during adjustment of the cam substantially constant.

2. An apparatus according to claim 1 in which the means for varying the axial position of the distributor member includes a speed responsive means, and a lever mechanism coupling the speed responsive means to said distributor member.

3. An apparatus according to claim 2 in which said further means includes an adjustable pivot for said lever mechanism.

4. An apparatus according to claim 3 in which said pivot is engaged with a cam surface defined on said cam whereby as the angular position of said cam is adjusted the position of said pivot will be varied to maintain the fuel delivered by the apparatus substantially constant.

5. An apparatus according to claim 4 in which said speed responsive means comprises a centrifugal weight mechanism.

* * * * *